United States Patent
Ooishi et al.

(10) Patent No.: US 9,979,013 B2
(45) Date of Patent: May 22, 2018

(54) ELECTRODE MATERIAL, PASTE, ELECTRODE PLATE, AND LITHIUM ION BATTERY

(71) Applicant: SUMITOMO OSAKA CEMENT CO., LTD., Chiyoda-ku, Tokyo (JP)

(72) Inventors: Kenta Ooishi, Tokyo (JP); Takao Kitagawa, Tokyo (JP); Kouji Oono, Tokyo (JP); Satoru Oshitari, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 143 days.

(21) Appl. No.: 14/263,167

(22) Filed: Apr. 28, 2014

(65) Prior Publication Data
US 2014/0335413 A1    Nov. 13, 2014

(30) Foreign Application Priority Data
Apr. 30, 2013 (JP) .................. 2013-095850

(51) Int. Cl.
*H01M 4/00* (2006.01)
*H01M 4/36* (2006.01)
(Continued)

(52) U.S. Cl.
CPC ........... *H01M 4/366* (2013.01); *H01M 4/136* (2013.01); *H01M 4/5825* (2013.01);
(Continued)

(58) Field of Classification Search
CPC .... H01M 4/366; H01M 4/5825; H01M 4/136; H01M 10/0525; H01M 2220/20; Y02E 60/122
(Continued)

(56) References Cited

U.S. PATENT DOCUMENTS

| | | | | |
|---|---|---|---|---|
| 2010/0248038 | A1* | 9/2010 | Takami | H01M 4/364 429/332 |
| 2012/0237833 | A1 | 9/2012 | Guerfi et al. | |
| 2013/0337327 | A1* | 12/2013 | Sun | H01M 4/0471 429/219 |

FOREIGN PATENT DOCUMENTS

| JP | A-2009-190957 | 8/2009 |
|---|---|---|
| JP | A-2010-135305 | 6/2010 |

(Continued)

OTHER PUBLICATIONS

Office Action for corresponding Japanese Patent Application No. 2014-093094 (dated Jan. 20, 2015), 4 pp.

*Primary Examiner* — Nicholas P D'Aniello
(74) *Attorney, Agent, or Firm* — Merchant & Gould P.C.

(57) ABSTRACT

An electrode material includes Fe-containing olivine-structured $Li_xA_yD_zPO_4$ (wherein A represents one or more elements selected from the group consisting of Co, Mn, Ni, Cu, and Cr; D represents one or more elements selected from the group consisting of Mg, Ca, Sr, Ba, Ti, Zn, B, Al, Ga, In, Si, Ge, Sc, Y, and rare earth elements; $0<x\leq 2$; $0<y\leq 1$; and $0\leq z\leq 1.5$) particles that are coated with a carbon coating film, in which an abundance of Fe is 0.01 to 0.1 mol with respect to 1 mol of $Li_xA_yD_zPO_4$, and an abundance ratio (Fe/(Fe+A+D)) of Fe on surfaces of the $Li_xA_yD_zPO_4$ particles is 0.02 to 0.25.

8 Claims, 2 Drawing Sheets

(51) Int. Cl.
    *H01M 4/136*     (2010.01)
    *H01M 4/58*     (2010.01)
    *H01M 10/0525*     (2010.01)

(52) U.S. Cl.
    CPC .... *H01M 10/0525* (2013.01); *H01M 2220/20* (2013.01); *Y02E 60/122* (2013.01)

(58) Field of Classification Search
    USPC .................................................. 429/220, 221
    See application file for complete search history.

(56) References Cited

FOREIGN PATENT DOCUMENTS

| | | | |
|---|---|---|---|
| JP | A-2011-213587 | 10/2011 | |
| JP | A-2012-104290 | 5/2012 | |
| JP | A-2013-504858 | 2/2013 | |
| JP | A-2013-063898 | 4/2013 | |
| JP | A-2013-065551 | 4/2013 | |
| WO | WO 2012067449 A3 * | 7/2012 | .......... H01M 4/1397 |

* cited by examiner

ELECTRODE MATERIAL, PASTE, ELECTRODE PLATE, AND LITHIUM ION BATTERY

This application claims the benefit of priority to Japanese Patent Application No. 2013-095850 filed 30 Apr. 2013, the disclosure of which is hereby incorporated by reference in its entirety.

BACKGROUND OF THE INVENTION

Field of the Invention

The present invention relates to an electrode material, a paste, an electrode plate, and a lithium ion battery, particularly, to an electrode material which is suitably used for a cathode of a lithium ion battery, a paste, an electrode plate, and a lithium ion battery including this electrode plate.

Description of Related Art

Recently, along with the rapid progress in the development of clean energy techniques, the development of techniques aimed at earth-friendly societies has been progressing, for example, the wide use of post-petroleum, zero-emission, and power-saving products. In particular, recently, secondary batteries which are used for high-capacity storage batteries, portable electronic equipment, or the like and can supply energy for electric vehicles or in cases of emergency have been in the limelight. As such secondary batteries, for example, lead storage batteries, alkali storage batteries, or lithium ion batteries are known.

In particular, lithium ion batteries which are non-aqueous electrolytic solution secondary batteries can be reduced in size and weight and increased in capacity and have superior properties such as high output and high energy density. Therefore, lithium ion batteries have been commercialized as a high-output power supply of electric vehicles, electric tools, or the like, and next-generation lithium ion battery materials have been actively developed all over the world.

In addition, recently, a home energy management system (HEMS) which is a collaboration of energy techniques and housing techniques has been known. A smart energy-saving system has attracted attention in which the optimization of automatic control, electric power supply and demand, and the like is controlled by integrating information relating to home electric appliances such as smart appliances, electric vehicles, or photovoltaic power generators and control system thereof.

As a cathode active material for a lithium ion battery which has been into practice, $LiCoO_2$ or $LiMnO_2$ is commonly used. However, Co is a rare resource which is unevenly distributed on earth and thus, for example, when being required to be used in a large amount as a cathode material, has a problem in that the production cost of a product is increased and stable supply is difficult. As an alternative cathode active material to $LiCoO_2$, the research and development of a cathode active material such as $LiMn_2O_4$ having a spinel crystal structure, $LiNi_{1/3}Mn_{1/3}Co_{1/3}O_2$ having a ternary system composition, lithium iron oxide ($LiFeO_2$) which is an iron-based compound, or lithium iron phosphate ($LiFePO_4$) and lithium manganese phosphate ($LiMnPO_4$) which have an olivine structure have been actively progressed.

In such cathode active materials having an olivine structure, since the electron conductivity is insufficient, various countermeasures such as the refining of particles or the forming of a composite material between particles and a conductive material are required for high-current charging and discharging, and much effort has been made to solve this problem.

However, when particles are refined or when a large amount of conductive material is used to form a composite material, the electrode density is decreased, which leads to a decrease in battery density. That is, there is a problem in that the capacity per unit volume is decreased. As a method for solving this problem, a carbon coating method is disclosed, the carbon coating method including: mixing an organic material solution, which is an electron conductive material and a carbon precursor, with electrode active material particles to obtain a mixture; drying the mixture to obtain a dry material; heating the dry material in a non-oxidizing atmosphere to carbonize an organic material such that an electrode material in which surfaces of the electrode active material particles are coated with carbon is obtained.

This carbon coating method has advantageous effects in that the surfaces of the electrode active material particles can be coated with carbon, and the conductivity can be improved without a significant decrease in electrode density. Therefore, various techniques relating to this method have been disclosed.

As one of these techniques, an electrode material in which surfaces of $LiFePO_4$ particles are coated with carbon produced by thermal decomposition of reducing sugar is disclosed (for example, refer to Japanese Laid-Open Patent Publication No. 2009-190957).

This electrode material can be easily synthesized by spraying a solution or a suspension including an Fe component, a P component, and reducing sugar and heating the solution or the suspension.

However, most of electrode materials which are obtained with the carbon coating method are $LiFePO_4$ alone or a compound containing $LiFePO_4$ and a slight amount of a different element. Therefore, there is a problem in that carbon active materials having an olivine structure other than $LiFePO_4$ are not sufficiently coated with carbon.

For example, in the case of $LiMnPO_4$, since Mn functions as a negative catalyst for suppressing a carbonization reaction, it is difficult to improve the electron conductivity with the carbon coating method.

Since $LiFePO_4$ has lower capacity and energy density than those of other cathode active materials having an olivine structure such as $LiMnPO_4$, a carbon coating method is also required for carbon active materials having an olivine structure other than $LiFePO_4$.

In order to solve the above-described problems, a method of improving a coverage of carbon in $LiMnPO_4$ by allowing nickel or iron to be present on surfaces of particles is disclosed (for example, refer to Japanese Laid-Open Patent Publication No. 2010-135305).

SUMMARY OF THE INVENTION

However, in the method disclosed in Japanese Laid-Open Patent Publication No. 2010-135305, it is necessary that a sufficient amount of Fe be added against the action of Mn which is a negative catalyst, for example, it is necessary that a large amount of Fe be added to the extent that an Fe/Mn ratio is greater than 10/90. As a result, regions where the electrochemical reaction potential is low occupy greater than 10% of the entire electrode active material, and thus there is a problem in that effects of $LiMnPO_4$ such as high capacity and high energy cannot be sufficiently exhibited.

The invention has been made in order to solve the above-described problems, and an object thereof is to provide an electrode material capable of exhibiting high capacity and high energy; a paste; an electrode plate; and a lithiumionbattery.

As a result of thorough investigation for solving the above-described problems, the present inventors found that an electrode material having superior electron conductivity and capable of sufficiently exhibiting effects of $Li_xA_yD_zPO_4$ such as high capacity and high energy can be obtained with the following configuration: the electrode material including Fe-containing olivine-structured $Li_xA_yD_zPO_4$ (wherein A represents one or more elements selected from the group consisting of Co, Mn, Ni, Cu, and Cr; D represents one or more elements selected from the group consisting of Mg, Ca, Sr, Ba, Ti, Zn, B, Al, Ga, In, Si, Ge, Sc, Y, and rare earth elements; $0<x\leq2$; $0<y\leq1$; and $0\leq z\leq1.5$) particles (hereinafter simply referred to as "$Li_xA_yD_zPO_4$ particles") that are coated with a carbon coating film, in which an abundance of Fe is 0.01 to 0.1 mol with respect to 1 mol of $Li_xA_yD_zPO_4$, and an abundance ratio (Fe/(Fe+A+D)) of Fe on surfaces of the $Li_xA_yD_zPO_4$ particles is 0.02 to 0.25.

That is, according to a first aspect of the invention, there is provided an electrode material including Fe-containing olivine-structured $Li_xA_yD_zPO_4$ (wherein A represents one or more elements selected from the group consisting of Co, Mn, Ni, Cu, and Cr; D represents one or more elements selected from the group consisting of Mg, Ca, Sr, Ba, Ti, Zn, B, Al, Ga, In, Si, Ge, Sc, Y, and rare earth elements; $0<x\leq2$; $0<y\leq1$; and $0\leq z\leq1.5$) particles that are coated with a carbon coating film, in which an abundance of Fe is 0.01 to 0.1 mol with respect to 1 mol of $Li_xA_yD_zPO_4$, and an abundance ratio (Fe/(Fe+A+D)) of Fe on surfaces of the $Li_xA_yD_zPO_4$ particles is 0.02 to 0.25.

According to a second aspect of the invention, there is provided a paste including: the electrode material according to the first aspect; a conductive auxiliary agent; and a binder.

According to a third aspect of the invention, there is provided an electrode plate which is obtained by forming an electrode on a principal surface of a current collector using the paste according to the second aspect.

According to a fourth aspect of the invention, there is provided a lithium ion battery including the electrode plate according to the third aspect.

In the electrode material according to the first aspect, the abundance of Fe in the electrode material and the abundance ratio (Fe/(Fe+A+D)) of Fe on the surfaces of the $Li_xA_yD_zPO_4$ particles are controlled. As a result, the effects of the $Li_xA_yD_zPO_4$ particles such as high capacity and high energy can be sufficiently exhibited.

The paste according to the second aspect includes the electrode material according to the first aspect. As a result, when an electrode is formed by coating this paste on a principal surface of a current collector, an electrode plate having high capacity and high energy density can be provided.

The electrode plate according to the third aspect includes the electrode material according to the first aspect. As a result, an electrode plate having high capacity and high energy density can be provided.

The lithium ion battery according to the fourth aspect includes the electrode material according to the first aspect. As a result, a lithium ion battery having high capacity and high energy density can be provided.

DETAILED DESCRIPTION OF THE INVENTION

Figure 1:
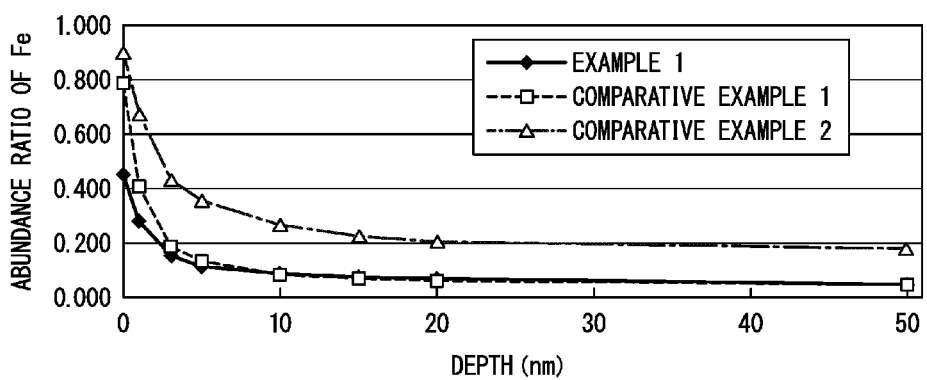
FIG. 1 is a graph illustrating a relationship between a depth direction and an Fe abundance ratio in a dry material obtained in each of Examples 1 to 3 and Comparative Examples 1 to 3.

Embodiments of an electrode material, a paste, an electrode plate, and a lithium ion battery according to the invention will be described.

These embodiments are merely examples for easy understanding of the scope of the invention. Unless specified otherwise, the invention is not limited to these embodiments.

Electrode Material

An electrode material according to an embodiment of the invention includes Fe-containing olivine-structured $Li_xA_yD_zPO_4$ (wherein A represents one or more elements selected from the group consisting of Co, Mn, Ni, Cu, and Cr; D represents one or more elements selected from the group consisting of Mg, Ca, Sr, Ba, Ti, Zn, B, Al, Ga, In, Si, Ge, Sc, Y, and rare earth elements; $0<x\leq2$; $0<y\leq1$; and $0\leq z\leq1.5$) particles that are coated with a carbon coating film, in which an abundance of Fe is 0.01 to 0.1 mol with respect to 1 mol of $Li_xA_yD_zPO_4$, and an abundance ratio (Fe/(Fe+A+D)) of Fe on surfaces of the $Li_xA_yD_zPO_4$ particles is 0.02 to 0.25.

It is preferable that A represent Co, Mn, or Ni and D represent Mg, Ca, Sr, Ba, Ti, Zn, or Al from the viewpoints of high discharge potential and the like.

The rare earth elements described herein refer to 15 lanthanum-based elements of La, Ce, Pr, Nd, Pm, Sm, Eu, Gd, Tb, Dy, Ho, Er, Tm, Yb, and Lu.

In addition, as $Li_xA_yD_zPO_4$, $Li_xA_yPO_4$ is preferable, and $Li_xMn_yPO_4$ is more preferable.

In the electrode material according to the embodiment, it is preferable that the abundance of Fe be decreased from the surfaces of the $Li_xA_yD_zPO_4$ particles toward centers of the $Li_xA_yD_zPO_4$ particles.

The reason is presumed to be as follows. Fe has higher Li ion conductivity than that of A. Therefore, by forming such an Fe distribution, a Li ion conductive path is formed inside the $Li_xA_yD_zPO_4$ particles, and the diffusibility of Li ions inside the $Li_xA_yD_zPO_4$ particles can be improved.

In addition, it is preferable that the electrode material according to the embodiment include aggregated particles that are obtained by allowing the Fe-containing olivine-structured LixAyDzPO4 particles coated with the carbon coating film to aggregate.

"The aggregated particles that are obtained by allowing the Fe-containing olivine-structured $Li_xA_yD_zPO_4$ particles coated with the carbon coating film to aggregate" described herein includes both states: a state where carbon coating films of the $Li_xA_yD_zPO_4$ particles are in contact with each other; and a state where the Fe-containing olivine-structured $Li_xA_yD_zPO_4$ particles are in contact with each other. However, the state where the carbon coating films are in contact with each other is more preferable.

This contact state is not particularly limited, but is preferably an aggregate state in which the Fe-containing olivine-structured $Li_xA_yD_zPO_4$ particles or the carbon coating films are strongly connected in a neck shape in which the contact area is small and the contact portion has a small cross-sectional area. That is, it is preferable that the contact area be decreased because gaps are formed inside the aggregated particles, and thus the diffusibility of Li ions is more easily improved. In addition, it is more preferable that the contact portion have a neck shape having a small cross-section because a structure in which channel-shaped (net-shaped) gaps are three-dimensionally spread is formed inside the aggregates.

In the electrode material according to the embodiment, the abundance of Fe is 0.01 to 0.1 mol, preferably 0.03 to 0.1 mol, and more preferably 0.05 to 0.09 mol with respect to 1 mol of $Li_xA_yD_zPO_4$. Alternatively, the abundance of Fe is 0.01 to 0.1 mol, preferably 0.03 to 0.1 mol, and more preferably 0.05 to 0.09 mol with respect to 1 mol of P.

By controlling the abundance of Fe in the electrode material to be in the above-described range, the $Li_xA_yD_zPO_4$ particles are coated with the carbon coating film required for securing the electron conductivity without inhibiting the properties of $Li_xA_yD_zPO_4$ such as high capacity and high energy.

The abundance ratio (Fe/(Fe+A+D)) of Fe on the surfaces of the $Li_xA_yD_zPO_4$ particles is 0.02 to 0.25, preferably 0.05 to 0.20, and more preferably 0.10 to 0.18.

The details of the reason why the abundance ratio of Fe on the surfaces of the $Li_xA_yD_zPO_4$ particles is preferably in the above-described range are not clearly but presumed to be as follows.

In the related art, an electrode material is prepared such that Fe is uniformly distributed on the surfaces of the $Li_xA_yD_zPO_4$ particles to uniformly form the carbon coating film thereon. Therefore, the abundance ratio of Fe on the particle surfaces is high. That is, Fe is present to the extent that the abundance ratio of Fe is greater than 0.25.

However, when the abundance ratio of Fe on the surfaces of the $Li_xA_yD_zPO_4$ particles is greater than 0.25 and thus the carbon coating film is uniformly formed thereon, the electron conductivity is improved, but the diffusion of lithium ions is inhibited. The effects of the $Li_xA_yD_zPO_4$ particles such as high capacity and high energy cannot be sufficiently obtained.

When the abundance ratio of Fe on the surfaces of the $Li_xA_yD_zPO_4$ particles is decreased (when the abundance ratio of Fe on the surfaces of the $Li_xA_yD_zPO_4$ particles is 0.25 or less), that is, when portions where A and D are exposed are increased and thus portions where Fe is not present on the surfaces of the $Li_xA_yD_zPO_4$ particles are increased, the carbon coating is not uniformly coated. Therefore, by allowing portions where the electron conductivity is high and portions where the diffusibility of lithium ions is high to be mixed on the surfaces of the $Li_xA_yD_zPO_4$ particles, the effects of high capacity and high energy can be obtained as the electrode material.

In addition, even in $Li_xA_yD_zPO_4$ particles which are partially coated with the carbon coating film, the abundance ratio of Fe is high on coated portions. Therefore, the effects of high capacity and high energy cannot be sufficiently obtained in the entire electrode material.

That is, presumably, it is preferable that Fe be scattered on the surfaces of the $Li_xA_yD_zPO_4$ particles to the extent that the electrode material can obtain the effects of high capacity and high energy.

"High capacity" described herein refers to the current capacity, which is measured with the following method, being 130 mAh/g or higher when the discharge capacity of a lithium ion battery is 0.1 C.

An electrode material, polyvinylidene fluoride, acetylene black are mixed with each other at a mass ratio of 85:10:5, and N-methyl-2-pyrrolidinone (NMP) is added thereto such that the solid content is 60% by mass. As a result, a paste is prepared.

Next, this paste is coated on an aluminum (Al) foil having a thickness of 15 μm through a doctor blade having a gap of 300 μm, followed by drying.

Next, the aluminum foil is pressed at a pressure of 600 kgf/cm² to prepare an electrode plate as a cathode of a lithium ion battery.

Relative to the cathode of the lithium ion battery, lithium metal is disposed as an anode, and a separator formed of porous polypropylene is disposed between the cathode and the anode. As a result, a battery member is obtained.

Next, ethylene carbonate (EC) and ethyl methyl carbonate (EMC) is mixed at a volume ratio of 1:1 to obtain a mixed solvent, and lithium hexafluorophosphate (LiPF6) is dissolved in the mixed solvent at a concentration of 1 mol/dm³. As a result, a mixed solution is prepared. The battery member is dipped in the solution. As a result, a lithium ion battery is prepared.

The lithium ion battery prepared as above is charged with a constant current at 25° C. until the charge voltage is 4.3 V at a current value of 0.1 C, and then is charged with a constant voltage. Once the current value is 0.01 C, charging is finished. Next, the lithium ion battery is discharged at a discharge current of 0.1 C. Once the battery voltage is 2 V, discharging is finished. At this time, the discharge capacity is measured.

In this case, when the current capacity which is measured in the above-described manner at a discharge current of 0.1 C is 130 mAh/g or higher, the current capacity is considered the high capacity. The current capacity at a discharge current of 0.1 C is preferably 138 mAh/g or higher, more preferably 145 mAh/g or higher, and still more preferably 153 mAh/g or higher.

In addition, it is more preferable that a plateau potential derived from a large amount of Fe not appear when the lithium ion battery is discharged at a discharge current of 0.1 C.

Further, the lithium ion battery obtained through the above-described procedure is charged with a constant current at 25° C. until the charge voltage is 4.3 V at a current value of 0.1 C, and then is charged with a constant voltage. Once the current value is 0.01 C, charging is finished. Next, the lithium ion battery is discharged at a discharge current of 3 C. Once the battery voltage is 2 V, discharging is finished. At this time, the discharge capacity is measured.

In this case, when the current capacity which is measured in the above-described manner at a discharge current of 3 C is 120 mAh/g or higher, the current capacity is considered the high capacity. The current capacity is preferably 130 mAh/g or higher and more preferably 140 mAh/g or higher.

In addition, "high energy" described in this specification refers to the power capacity, which is calculated from the result of measuring the current capacity at a discharge current of 0.1 C in the same manner as above, being 500 mWh/g or higher. The power capacity is preferably 550 mWh/g or higher.

The abundance ratio (Fe/(Fe+A+D)) of Fe can be calculated by measuring Fe, A, and D using a time-of-flight secondary ion mass spectrometer (TOF-SIMS).

For example, a sample in which the electrode material is buried in indium is prepared. Most $Li_xA_yD_zPO_4$ particles whose surfaces are uniform are arranged on the outermost surface of the sample and are laminated in a depth direction. Regarding this sample, a region which is about 50 to 200 times the size of one of the $Li_xA_yD_zPO_4$ particles is scanned with Ga ion beams (beam diameter: submicron) using a time-of-flight secondary ion mass spectrometer (TOF-SIMS). While excavating the $Li_xA_yD_zPO_4$ particles which are arranged on the sample surface and are laminated inside the sample, the numbers of Fe atoms, A atoms, D atoms are counted at each depth to calculate the abundance ratio (Fe/(Fe+A+D)) of Fe at each depth.

Since the detection depth of the time-of-flight secondary ion mass spectrometer (TOF-SIMS) is in the order of sub-nanometer, the abundance of Fe contained in the surfaces of the $Li_xA_yD_zPO_4$ particles can be detected based on data of the outermost surface.

The abundance ratio of Fe on the surfaces of the $Li_xA_yD_zPO_4$ particles which is measured in the above-described manner is 0.02 to 0.25, preferably 0.05 to 0.20, and more preferably 0.10 to 0.18.

By allowing Fe on the surfaces of the $Li_xA_yD_zPO_4$ particles to be present in the above-described range, the electron conductivity and the lithium ion diffusibility are improved. As a result, an electrode material having the effects of high capacity and high energy is obtained.

The average particle size of the Fe-containing olivine-structured $Li_xA_yD_zPO_4$ particles, and are coated with a carbon coating film is preferably 0.01 to 20 μm and more preferably 0.02 to 5 μm.

The reason for limiting the average particle size of the Fe-containing olivine-structured $Li_xA_yD_zPO_4$ particles coated with the carbon coating film to the above-described range is as follows. When the average particles size is less than 0.01 μm, it is difficult to sufficiently coat the surfaces of the $Li_xA_yD_zPO_4$ particles with a carbon thin film, the discharge capacity during high-speed charging and discharging is decreased, and thus it is difficult to realize sufficient charge-discharge performance. On the other hand, when the average particles size is greater than 20 μm, the internal resistance of the $Li_xA_yD_zPO_4$ particles is increased, and thus the discharge capacity during high-speed charging and discharging is insufficient.

In order to obtain the average particle size the Fe-containing olivine-structured $Li_xA_yD_zPO_4$ particles coated with the carbon coating film, the $Li_xA_yD_zPO_4$ particles are observed using a scanning electron microscope (SEM) or the like, a predetermined number of the $Li_xA_yD_zPO_4$ particles, for example, 200 or 100 $Li_xA_yD_zPO_4$ particles are selected, longest linear portions (maximum lengths) of the respective $Li_xA_yD_zPO_4$ particles are measured, and the average value of the measured values is calculated.

Alternatively, the Fe-containing olivine-structured $Li_xA_yD_zPO_4$ particles coated with the carbon coating film are dispersed in a solvent such as water to obtain a dispersion, and the number average particle size of the dispersion is measured using a laser diffraction scattering particle size distribution analyzer or the like.

On the other hand, when the Fe-containing olivine-structured $Li_xA_yD_zPO_4$ particles coated with the carbon coating film aggregate to form aggregated particles, the average particle size of the aggregated particles is preferably 0.5 to 100 μm and more preferably 1 to 20 μm.

The reason for limiting the average particle size of the aggregated particles to the above-described range is as follows. When the average particle size of the aggregated particles is less than 0.5 μm, the aggregated particles are excessively small and easily moved, and thus are difficult to handle during the preparation of an electrode-forming paste. On the other hand, when the average particle size of the aggregated particles is greater than 100 μm, during the preparation of a battery electrode, there is a high possibility that aggregated particles having a size greater than the thickness of the dried electrode may be present. Accordingly, it is difficult to maintain the uniformity in the thickness of the electrode.

Similarly to the case of the average particle size of the Fe-containing olivine-structured $Li_xA_yD_zPO_4$ particles coated with the carbon coating film, the average particle size of the aggregated particles may be obtained by being observed using an SEM or the like, or may be obtained by being dispersed in water or the like and measuring the number average particle size of the dispersion using a laser diffraction scattering particle size distribution analyzer or the like.

The volume density of these aggregates can be measured using a mercury porosimeter, and is preferably 40 to 95 vol % and more preferably 60 to 90 vol % with respect to the volume density of a case where the aggregated particles are solid.

By controlling the volume density of the aggregated particles to be 40 vol % or greater as described above, the aggregated particles are densified, and the strength of the aggregated particles is increased. For example, when the electrode material according to the embodiment, a binder, a conductive auxiliary agent, and a solvent are mixed to prepare an electrode slurry, the aggregated particles are not easily collapsed. As a result, an increase in the viscosity of the electrode slurry is suppressed, and the fluidity is maintained. Thus, the coating property is improved, and the filling property of the electrode material during the coating of the electrode slurry can be improved.

In addition, in the Fe-containing olivine-structured $Li_xA_yD_zPO_4$ particles coated with the carbon coating film, it is preferable that 80% or greater and preferably 90% or greater of the surfaces of the $Li_xA_yD_zPO_4$ particles be coated with the carbon coating film.

The coverage of the carbon coating film can be measured using a transmission electron microscope (TEM) or an energy-dispersive X-ray spectrometer (EDX). It is not preferable that the coverage of the carbon coating film be less than 80% because a covering effect of the carbon coating film is insufficient. In addition, in a lithium ion battery prepared using this electrode material, the power capacity is decreased due to a decrease in plateau potential and the like.

The thickness of the carbon coating film is preferably 0.1 to 20 nm.

The reason for limiting the thickness of the carbon coating film to the above-described range is as follows. When the thickness is less than 0.1 nm, the thickness of the carbon coating film is excessively small, and it is difficult to form a film having a desired resistance value. As a result, the conductivity is decreased, and it is difficult to secure the conductivity as an electrode material. On the other hand, when the thickness is greater than 20 nm, battery activity, for example, the battery capacity per unit mass of an electrode material is decreased.

The amount of carbon in the carbon coating film is preferably 0.5 to 5 parts by mass and more preferably 1 part by mass to 2 parts by mass with respect to 100 parts by mass of the $Li_xA_yD_zPO_4$ particles.

The reason for limiting the amount of carbon in the carbon coating film to the above-described range is as follows. When the amount of carbon is less than 0.5 parts by mass, during the formation of a battery, the discharge capacity at a high charge-discharge rate is decreased, and it is difficult to realize sufficient charge-discharge rate performance. On the other hand, when the amount of carbon is greater than 5 parts by mass, the amount of carbon is excessively large. As a result, the battery capacity of a lithium ion battery per unit mass of the Fe-containing olivine-structured $Li_xA_yD_zPO_4$ particles is decreased more than necessary.

The shape of the Fe-containing olivine-structured $Li_xA_yD_zPO_4$ particles is not particularly limited, but is preferably spherical because an electrode material is easily formed of spherical particles, particularly, true-spherical secondary particles.

The reason why the spherical shape is preferable is as follows. When the Fe-containing olivine-structured LixAy-DzPO4 particles coated with the carbon coating film, a binder resin (binder), and a solvent are mixed with each other to prepare a cathode-forming paste, the amount of the solvent can be reduced, and the cathode-forming paste is easily coated on a current collector. In addition, it is preferable that the shape of the Fe-containing olivine-structured $Li_xA_yD_zPO_4$ particles coated with the carbon coating film be spherical because the surface area of the $Li_xA_yD_zPO_4$ particles is minimum, the amount of a binder resin (binder) added can be minimized, and the internal resistance of the obtained cathode can be decreased.

Further, when the shape of the Fe-containing olivine-structured $Li_xA_yD_zPO_4$ particles is spherical, particularly true-spherical, the Fe-containing olivine-structured $Li_xA_yD_zPO_4$ particles are easily close-packed. Therefore, the filling amount of a cathode material per unit volume is increased, the electrode density can be increased, and thus the capacity of a lithium ion battery can be increased.

On the surfaces of the Fe-containing olivine-structured $Li_xA_yD_zPO_4$ particles coated with the carbon coating film according to the embodiment, $Li_xA_yD_zFe_aPO_4$ in which Fe is solid-solubilized may be present, or $Li_xA_yD_zFe_aPO_4$ may be present inside the particles.

Regarding a, $0<a\leq1.5$ is satisfied, $0.01\leq a\leq1.0$ is preferable, $0.03\leq a\leq0.5$ is more preferable, and $0.05\leq a\leq0.1$ is still more preferable.

A molar ratio of Fe and $Li_xA_yD_zPO_4$ can be calculated in terms of a value measured by ICP spectrometry with respect to 1 mol of P. In addition, x, y, z, and a can be calculated in terms of a value measured by ICP spectrometry with respect to 1 mol of P.

Method of Producing Electrode Material

A method of producing the electrode material according to the embodiment is not particularly limited. For example, the method includes: a process of mixing and dispersing $Li_xA_yD_zPO_4$ particles, $LiFePO_4$ precursor particles, and an organic compound to prepare a dispersion; and a process of drying this dispersion to obtain a dry material; and a process of baking the dry material in a non-oxidizing atmosphere.

The $Li_xA_yD_zPO_4$ particles are not particularly limited. For example, as a preferable method of preparing the $Li_xA_yD_zPO_4$ particles, a Li source, an A source, a D source, and a $PO_4$ source are put into water with a molar ratio of x:y:z:1 and are stirred to obtain a precursor solution of the $Li_xA_yD_zPO_4$ particles, and this precursor solution is put into a pressure-resistant container. Next, the precursor solution is hydrothermally treated in a high-temperature and high-pressure environment, for example, at a temperature of 120 to 250° C. under a pressure of 0.2 MPa or higher for 1 to 24 hours.

In this case, by controlling the temperature, the pressure, and the time during the hydrothermal treatment, the particle size of the $Li_xA_yD_zPO_4$ particles can be controlled to a desired size.

In this case, as the Li source, for example, one or more elements selected from the group consisting of lithium inorganic salts such as lithium hydroxide (LiOH), lithium carbonate ($Li_2CO_3$), lithium chloride (LiCl), or lithium phosphate ($Li_3PO_4$) and lithium organic salts such as lithium acetate ($LiCH_3COO$) or lithium oxalate (($COOLi)_2$) are preferably used.

Among these, lithium chloride and lithium acetate are preferable because a uniform solution phase is easily obtained.

As the A source, for example, one or more elements selected from the group consisting of a Co source formed of a cobalt compound, a Mn source formed of a manganese compound, a Ni sources formed of a nickel compound, a Cu source formed of a copper compound, and a Cr source formed of a chromium compound are preferable.

As the Co sources, Co salts are preferable, and for example, one or more elements selected from the group of cobalt chloride (II) ($CoCl_2$), cobalt sulfate (II) ($CoSO_4$), cobalt nitrate (II) ($Co(NO_3)_2$), cobalt acetate (II) ($Co(CH_3COO)_2$), and hydrates thereof are preferably used.

As the Mn sources, Mn salts are preferable, and for example, one or more elements selected from the group of manganese chloride (II) ($MnCl_2$), manganese sulfate (II) ($MnSO_4$), manganese nitrate (II) ($Mn(NO_3)_2$), manganese acetate (II) ($Mn(CH_3COO)_2$), and hydrates thereof are preferably used. Among these, manganese sulfate is preferable because a uniform solution phase is easily obtained.

As the Ni sources, Ni salts are preferable, and for example, one or more elements selected from the group of nickel chloride (II) ($NiCl_2$), nickel sulfate (II) ($NiSO_4$), nickel nitrate (II) ($Ni(NO_3)_2$), nickel acetate (II) ($Ni(CH_3COO)_2$), and hydrates thereof are preferably used.

As the $PO_4$ source, for example, one or more elements selected from the group consisting of phosphoric acids such as orthophosphoric acid ($H_3PO_4$) or metaphosphoric acid ($HPO_3$), ammonium dihydrogen phosphate ($NH_4H_2PO_4$), diammonium hydrogen phosphate (($NH_4)H_2PO_4$), ammonium phosphate (($NH_4)_3PO_4$), lithium phosphate ($Li_3PO_4$), dilithium hydrogen phosphate ($Li_2HPO_4$), lithium dihydrogen phosphate ($LiH_2PO_4$) and hydrates thereof are preferable.

In particular, orthophosphoric acid is preferable because a uniform solution phase is easily formed.

The $LiFePO_4$ precursor particles refers to the mixed solution containing the Li source, the Fe source, the $Po_4$ source, and water which is heated at a low temperature at which $LiFePO_4$ particles are not formed.

Such $LiFePO_4$ precursor particles can be obtained by putting the Li source, the Fe source, and the $PO_4$ source into water with a molar ratio of 1:1:1, stirring the mixture to obtain a precursor solution of $LiFePO_4$ particles, and heating this precursor solution at a temperature of 60 to 90° C. for 1 to 24 hours.

The reason for preferably preparing the $LiFePO_4$ precursor particles is as follows.

When the $LiFePO_4$ particles are mixed before being heated, the Li source, the Fe source, and the $PO_4$ source are uniformly present on the particle surfaces, and thus the carbon coating film is easily formed on the particle surfaces.

On the other hand, when the $LiFePO_4$ particles are heated at a high temperature at which $LiFePO_4$ particles are formed, it is difficult for Fe to be attached on the $LiFePO_4$ particles due to the state of the LiFePO$_4$ particles, and thus a desired amount of Fe cannot be allowed to be present on the surfaces of the Li$_x$A$_y$D$_z$PO$_4$ particles.

Since examples of the Li source and the PO$_4$ source are the same as above, the description thereof will not be repeated.

As the Fe source, for example, an iron compound such as iron chloride (II) (FeCl$_2$), iron sulfate (II) (FeSO$_4$), or iron acetate (II) (Fe(CH$_3$COO)$_2$) and a hydrate thereof; a trivalent iron compound such as iron nitrate (III) (Fe(No$_3$)$_3$), iron chloride (III) (FeCl$_3$), or iron citrate (III) (FeC$_6$H$_5$O$_7$); and lithium iron phosphate can be used.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrenesulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether, and polyol.

Examples of the polyol include polyethylene glycol, polypropylene glycol, polyglycerin, and glycerin.

The Li$_x$A$_y$D$_z$PO$_4$ particles and the LiFePO$_4$ precursor particles may be mixed such that the abundance of Fe is 0.01 to 0.1 mol with respect to 1 mol of Li$_x$A$_y$D$_z$PO$_4$.

The organic compound may be mixed such that the amount of carbon in the organic compound is 0.5 to 5 parts by mass with respect to 100 parts by mass of the Li$_x$A$_y$D$_z$PO$_4$ particles.

Next, the obtained mixed solution is dispersed to obtain a dispersion.

A dispersing method is not particularly limited, and it is preferable to use a dispersing machine capable of imparting dispersion energy to the extent that the aggregated state of the Li$_x$A$_y$D$_z$PO$_4$ particles are released and the LiFePO$_4$ precursor particles are scattered and attached on the surfaces of the Li$_x$A$_y$D$_z$PO$_4$ particles. Examples of such a dispersing machine include a ball mill, a sand mill, and a planetary mixer.

Next, the dispersing is dried to obtain a dry material.

In this process, a drying method is not particularly limited as long as the solvent (water) can be removed from the dispersion with this method.

When the aggregated particles are prepared, drying may be performed using a spray decomposition method. For example, a method of spraying and drying the dispersion at a high temperature of 100 to 300° C. to obtain a particulate dry material or a granular dry material may be used.

Next, the dry material is baked in an non-oxidizing atmosphere in a temperature range of 700 to 1000° C. and preferably 800 to 900° C.

As the non-oxidizing atmosphere, an inert atmosphere such as nitrogen (N$_2$) or argon (Ar) is preferable. When it is desired that the oxidation is further suppressed, a reducing atmosphere containing reducing gas such as hydrogen (H$_2$) is preferable.

The reason for limiting the baking temperature of the dry material to be 700 to 1000° C. is as follows. It is not preferable that the baking temperature be lower than 700° C. because the decomposition and reaction of the organic compound contained in the dry material is not sufficiently progressed, the carbonization of the organic compound is insufficient, and the obtained decomposition and reaction products are formed as high-resistance organic decomposition products. On the other hand, when the baking temperature is higher than 1000° C., a component constituting the dry material, for example, lithium (Li) is evaporated and the composition is deviated. In addition, the grain growth of the dry material is promoted, the discharge capacity at a high charge-discharge rate is decreased, and it is difficult to realize sufficient charge-discharge rate performance.

The baking time is not particularly limited as long as the organic compound is sufficiently carbonized, and for example, is 0.1 to 10 hours.

During this baking process, iron functions as a catalyst such that the organic compound is decomposed and reacts to form carbon during the heat treatment. As a result, this carbon is attached on the surfaces, as a starting point, of the Li$_x$A$_y$D$_z$PO$_4$ particles on which Fe is attached to form a carbon coating film. In this way, the surfaces of the Fe-containing Li$_x$A$_y$D$_z$PO$_4$ particles are coated with the carbon coating film, and the Fe-containing olivine-structured Li$_x$A$_y$D$_z$PO$_4$ particles coated with the carbon coating film; or the aggregated particles obtained by allowing the Fe-containing olivine-structured Li$_x$A$_y$D$_z$PO$_4$ particles to aggregate are prepared.

During the baking process, it is preferable that the dry material contain lithium because, along with an increase in baking time, lithium is diffused in the carbon coating film such that lithium is present inside the carbon coating film, and thus the conductivity of the carbon coating film is further improved.

However, it is not preferable that the baking time be excessively increased because abnormal grain growth occurs, and the particles or the aggregated particles in which a part of lithium is defected are formed. Thus, the performance of the Fe-containing olivine-structured Li$_x$A$_y$D$_z$PO$_4$ particles coated with the carbon coating film or the aggregated particles obtained by allowing the Fe-containing olivine-structured Li$_x$A$_y$D$_z$PO$_4$ particles to aggregate is decreased. As a result, characteristics of a battery using the Fe-containing olivine-structured Li$_x$A$_y$D$_z$PO$_4$ particles coated with the carbon coating film or the aggregated particles obtained by allowing the Fe-containing olivine-structured Li$_x$A$_y$D$_z$PO$_4$ particles to aggregate are decreased.

With the above-described method, the electrode material according to the embodiment can be produced.

In the above-described method, the Li$_x$A$_y$D$_z$PO$_4$ particles and the LiFePO$_4$ precursor particles are mixed such that the abundance of Fe is 0.01 to 0.1 mol with respect to 1 mol of Li$_x$A$_y$D$_z$PO$_4$, that is, such that the amount of Fe is decreased with respect to the total amount of the electrode material, followed by dispersing. Therefore, the LiFePO$_4$ precursor particles are easily scattered and attached on the surfaces of the Li$_x$A$_y$D$_z$PO$_4$ particles.

In a state where the LiFePO$_4$ precursor particles are scattered and attached on the surfaces of the Li$_x$A$_y$D$_z$PO$_4$ particles, the mixture is baked in a non-oxidizing atmosphere. Therefore, the carbon coating film is formed on the surfaces of the Li$_x$A$_y$D$_z$PO$_4$ particles, Fe can be diffused inside the Li$_x$A$_y$D$_z$PO$_4$ particles, and the concentration distribution of Fe is formed from the surfaces of the Li$_x$A$_y$D$_z$PO$_4$ particles to the inside of the Li$_x$A$_y$D$_z$PO$_4$ particles. That is, the abundance of Fe can be made to be decreased from the surfaces of the Li$_x$A$_y$D$_z$PO$_4$ particles toward the centers of the Li$_x$A$_y$D$_z$PO$_4$ particles.

Paste

A paste according to an embodiment of the invention includes: the electrode material according to the embodiment; a conductive auxiliary agent; and a binder.

The content of the electrode material is preferably 85 to 98.5% by mass and more preferably 90 to 98.5% by mass with respect to 100% by mass of the total mass of the electrode material, the conductive auxiliary agent, and the binder.

By containing the electrode material in this range, an electrode having superior battery characteristics can be obtained.

The conductive auxiliary agent is not particularly limited. For example, one or more elements selected from the group consisting of acetylene black, Ketjen black, Furnace black, and fibrous carbon such as vapor-grown carbon fiber (VGCF) or carbon nanotube can be used.

The content of the conductive auxiliary agent is preferably 0.1 to 7% by mass, more preferably 0.2 to 5% by mass, and still more preferably 0.5 to 3% by mass with respect to 100% by mass of the total mass of the electrode material, the conductive auxiliary agent, and the binder.

The reason for limiting the content of the conductive auxiliary agent to the above-described range is as follows. It is not preferable that the content be less than 0.1% by mass because, when an electrode is formed using the paste according to the embodiment, the electron conductivity is insufficient, and thus the battery capacity or the charge-discharge rate is decreased. On the other hand, it is not preferable that the content be greater than 7% by mass because the electrode material in the electrode is relatively decreased, and the battery capacity of a lithium ion battery per unit volume is decreased.

The binder is not particularly limited, and for example, one or more elements selected from the group consisting of polyvinylidene fluoride (PVdF), polytetrafluoroethylene (PTFE), styrene-butadiene rubber, polyethylene, and polypropylene may be used.

The content of the binder is preferably 0.5 to 10% by mass and more preferably 1 to 7% by mass with respect to 100% by mass of the total mass of the electrode material, the conductive auxiliary agent, and the binder.

The reason for limiting the content of the binder to the above-described range is as follows. It is not preferable that the content be less than 0.5% by mass because, when a coating film is formed using the paste according to the embodiment, a binding property between the coating film and a current collector is insufficient, and the coating film may be cracked or peeled off during the roll forming of the electrode or the like.

In addition, the coating film may be peeled off from the current collector during the charging and discharging of a battery, and thus the battery capacity and the charge-discharge rate may be decreased.

On the other hand, it is not preferable that the content be greater than 10% by mass because the internal resistance of the electrode material is increased, and the battery capacity at a high charge-discharge rate may be decreased.

A solvent may be appropriately mixed in order to easily coat the paste. The kind of the solvent is not particularly limited, and examples thereof include water; alcohols such as methanol, ethanol, 1-propanol, 2-propanol (isopropyl alcohol; IPA), butanol, pentanol, hexanol, octanol, or diacetone alcohol; esters such as ethyl acetate, butyl acetate, ethyl lactate, propylene glycol monomethyl ether acetate, propylene glycol monoethyl ether acetate, or γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, or diethylene glycol monoethyl ether; ketones such as acetone, methyl ethyl ketone (MEK), methyl isobutyl ketone (MIBK), acetylacetone, or cyclohexanone; amides such as dimethyl formamide, N,N-dimethylacetoacetamide, or N-methylpyrrolidone; and glycols such as ethylene glycol, diethylene glycol, or propylene glycol. These solvent may be used alone or in a combination of two or more kinds.

It is preferable that the solvent be mixed such that the solid content in the paste is 30 to 70% by mass. In other words, the total content of the electrode material, the conductive auxiliary agent, and the binder in the paste is preferably 30 to 70% by mass and more preferably 40 to 60% by mass. By mixing the above-described components in the above-described range, the electrode-forming paste which is superior in forming an electrode and battery characteristics can be obtained.

A method of preparing the paste according to the embodiment is not particularly limited as long as the electrode material, the conductive auxiliary agent, the binder, and the solvent can be uniformly mixed with this method. For example, a method using a kneading machine such as a ball mill, a sand mill, a planetary mixer, a paint shaker, or a homogenizer may be used.

Electrode Plate

An electrode plate according to an embodiment of the invention is obtained by forming an electrode on a principal surface of a current collector using the paste according to the embodiment. This electrode plate is used for a cathode of a lithium ion battery.

A method of producing the electrode plate according to the embodiment is not particularly limited as long as an electrode can be formed on a surface of a current collector using the electrode material according to the embodiment with this method.

For example, the paste according to the embodiment is coated on a single surface of a current collector, and this coating film is dried and pressed. As a result, an electrode plate in which the electrode is formed on the single surface of the current collector can be obtained.

Lithium Ion Battery

A lithium ion battery according to an embodiment of the invention includes the electrode plate according to the embodiment.

The lithium ion battery according to the embodiment includes a cathode formed of the electrode plate according to the embodiment, an anode, a separator, and an electrolytic solution.

In the lithium ion battery according to the embodiment, the anode, the electrolytic solution, the separator, and the like are not particularly limited.

For example, as the anode, an anode material such as metal Li, a carbon material, an Li alloy, or $Li_4Ti_5O_{12}$ can be used.

In addition, a solid electrolyte may be used instead of the electrolytic solution and the separator.

The electrolytic solution can be prepared by, for example, mixing ethylene carbonate (EC) and ethyl methyl carbonate (EMC) at a volume ratio of 1:1 to obtain a mixed solvent and dissolving lithium hexafluorophosphate ($LiPF_6$) in the mixed solvent at a concentration of, for example, 1 mol/dm$^3$.

As the separator, for example, porous propylene can be used.

In the lithium ion battery according to the embodiment, since the electrode plate according to the embodiment is used as the cathode, high capacity and high energy are obtained.

As described above, in the electrode material according to the embodiment, the abundance of Fe in the electrode material and the abundance ratio of Fe on the surfaces of the $Li_xA_yD_zPO_4$ particles are controlled. As a result, the effects of the $Li_xA_yD_zPO_4$ particles such as high capacity and high energy can be sufficiently exhibited.

In addition, when the abundance of Fe is decreased from the surfaces of the $Li_xA_yD_zPO_4$ particles toward centers of the $Li_xA_yD_zPO_4$ particles, a Li ion conductive path is formed inside the $Li_xA_yD_zPO_4$ particles, and the diffusibility of Li ions inside the $Li_xA_yD_zPO_4$ particles can be further improved.

In addition, when the aggregated particles are obtained by allowing the Fe-containing olivine-structured LixAyDzPO4 particles coated with the carbon coating film to aggregate, gaps are formed inside the electrode material. Therefore, the diffusibility of Li ions can be improved.

The paste according to the embodiment includes the electrode material according to the embodiment. As a result, when an electrode is formed to prepare an electrode plate by coating this paste on a principal surface of a current collector, the electrode plate having high capacity and high energy density can be provided.

The electrode plate according to the embodiment includes the electrode material according to the embodiment. As a result, an electrode plate having high capacity and high energy density can be provided.

The lithium ion battery according to the embodiment includes the electrode material according to the embodiment. As a result, a lithium ion battery having high capacity and high energy density can be provided.

In addition, when the lithium ion battery according to the embodiment is discharged, a plateau potential derived from a large amount of Fe does not appear. Therefore, stable charge-discharge characteristics are obtained. Accordingly, when the lithium ion battery according to the embodiment is applied to electric vehicles, electronic equipment, or the like, it is not necessary that a circuit for compensating for a plateau potential derived from a large amount of Fe be provided. Therefore, a lithium ion battery having high versatility can be provided.

EXAMPLES

Example 1

Preparation of $LiMnPO_4$ Particles 4 mol of lithium acetate, 2 mol of manganese sulfate (II), and 2 mol of phosphoric acid were mixed with 2 L (liter) of water such that the total amount was 4 L. As a result, a uniform slurry mixture was prepared.

Next, this mixture was accommodated in a pressure-resistant sealed container having a volume of 8 L, followed by hydrothermal synthesis at 120° C. for 1 hour.

Next, the obtained precipitates were washed with water to obtain $LiMnPO_4$ particles.

Preparation of $LiFePO_4$ Precursor Particles

Water, lithium acetate, iron citrate (III), and phosphoric acid ($H_3PO_4$) were mixed at a molar ratio of 1:1:1.

Next, this mixed solution was heated at 60° C. for 24 hours to obtain $LiFePO_4$ precursor particles.

The obtained $LiMnPO_4$ particles, the obtained $LiFePO_4$ precursor particles, and polyvinyl alcohol were mixed with each other such that a molar ratio ($Fe/LiMnPO_4$) of Fe to $LiMnPO_4$ was 0.053 and the amount of polyvinyl alcohol (mass ratio; $PVA/LiMnPO_4$) to the $LiMnPO_4$ particles was 0.05.

Next, this mixed solution was dispersed with a sand mill at 2500 rpm for 6 hours to obtain a dispersion.

Next, this dispersion was sprayed and dried in the air at 180° C. to obtain a dry material.

Evaluation of Abundance Ratio of Fe in Dry Material

In order to evaluate the abundance ratio of Fe in the obtained dry material, the dry material was embedded into indium, a region thereof having a size of 10 μm×10 μm was scanned using a TOF-SIMS, and Fe and Mn were detected to calculate the abundance ratio of Fe. The abundance ratio (Fe/(Fe+Mn)) of Fe at each depth of the dry material is shown in Table 1. In addition, a relationship between the depth and the abundance ratio of Fe is illustrated in FIG. 1.

The obtained dry material was baked in a nitrogen ($N_2$) atmosphere at 700° C. for 1 hour to obtain an electrode material of Example 1.

When this electrode material was observed using a scanning electron microscope (SEM), it was found that the electrode material was formed of aggregated particles obtained by allowing the $LiMnPO_4$ particles to aggregate. In addition, the average particle size of Fe-containing olivine-structured $LiMnPO_4$ particles coated with the carbon coating film was 55 nm.

Evaluation of Abundance Ratio of Fe in Dry Material

Figure 2:
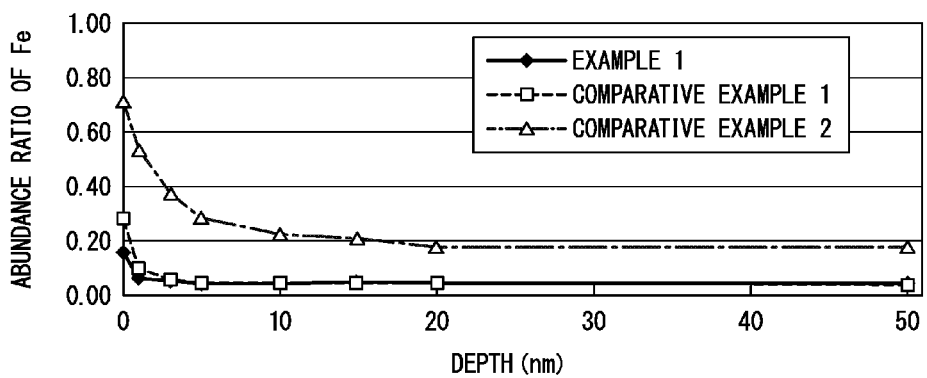
FIG. 2 is a graph illustrating a relationship between a depth direction and an Fe abundance ratio in an electrode material obtained in each of Examples 1 to 3 and Comparative Examples 1 to 3.

In order to evaluate the abundance ratio of Fe in the obtained electrode material, the electrode material was embedded into indium, a region thereof having a size of 10 μm×10 μm was scanned using a TOF-SIMS, and Fe and Mn were detected to calculate the abundance ratio of Fe. The abundance ratio (Fe/(Fe+Mn)) of Fe at each depth of the dry material is shown in Table 1. In addition, a relationship between the depth and the abundance ratio of Fe is illustrated in FIG. 2.

The obtained electrode material, polyvinylidene fluoride (PVdF), and acetylene black (AB) were mixed with each other at a mass ratio of 85:10:5. Further, N-methyl-2-pyrrolidone (NMP) was added to this mixture such that the solid content was 60% by mass. As a result, a paste of Example 1 was prepared.

Preparation of Electrode Plate

Next, the paste was coated on an aluminum (Al) foil having a thickness of 15 μm, followed by drying. Next, the aluminum foil was pressed at a pressure of 600 kgf/cm². An electrode plate was prepared as a cathode of a lithium ion battery of Example 1.

Preparation of Lithium Ion Battery

Relative to the cathode of the lithium ion battery, lithium metal was disposed as an anode, and a separator formed of porous polypropylene was disposed between the cathode and the anode. As a result, a battery member was obtained.

Next, ethylene carbonate (EC) and ethyl methyl carbonate (EMC) were mixed at a volume ratio of 1:1 to obtain a mixed solvent, and lithium hexafluorophosphate (LiPF6) was dissolved in the mixed solvent at a concentration of 1 mol/dm³. As a result, an electrolytic solution was prepared.

Next, the battery member was dipped in the electrolytic solution. As a result, a lithium ion battery of Example 1 was prepared.

Evaluation of Lithium Ion Battery

The charge-discharge characteristics of the lithium ion battery of Example 1 were evaluated.

Figure 3:
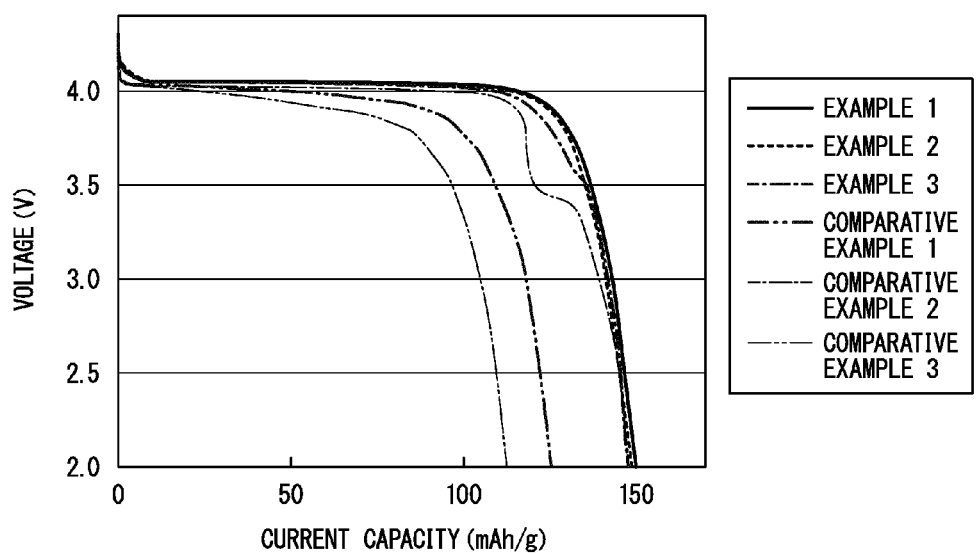
FIG. 3 is a graph illustrating the discharge evaluation results of a lithium ion battery obtained in each of Examples 1 to 3 and Comparative Examples 1 to 3 at a discharge current of 0.1 C.
Figure 4:
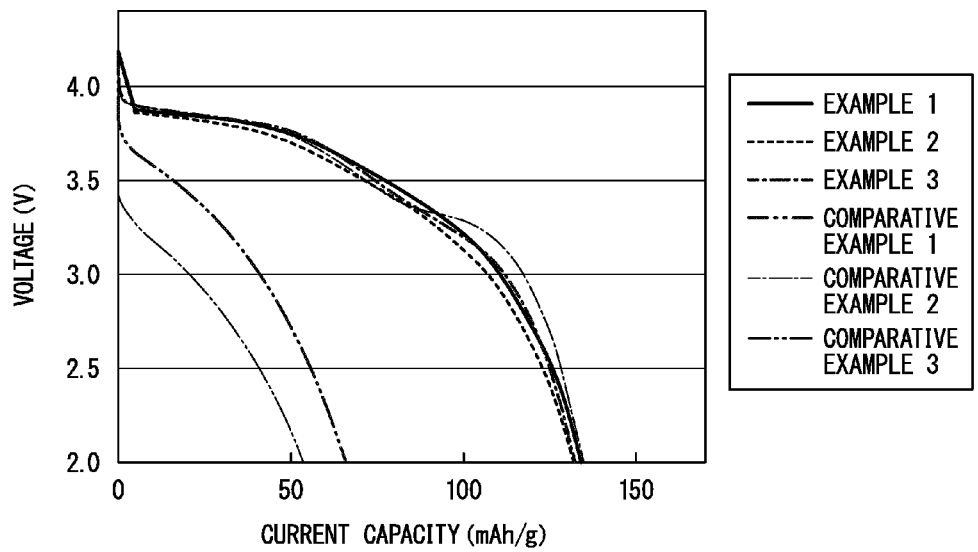
FIG. 4 is a graph illustrating the discharge evaluation results of a lithium ion battery obtained in each of Examples 1 to 3 and Comparative Examples 1 to 3 at a discharge current of 3 C.

The lithium ion battery of Example 1 was charged with a constant current at 25° C. until the charge voltage was 4.3 V at a current value of 0.1 C, and then was charged with a constant voltage. Once the current value was 0.01 C, charging was finished. Next, the lithium ion battery was discharged at discharge currents of 0.1 C and 3 C, respectively. Once the battery voltage was 2 V, discharging was finished. At this time, the discharge capacities at 0.1 C and 3 C were measured, respectively, and the power capacities were calculated. The results are shown in Table 2. In addition, the evaluation results at a discharge current of 0.1 C are shown in FIG. 3, and the evaluation results at a discharge current of 3 C are shown in FIG. 4.

Example 2

A dry material of Example 2 was obtained by the same manner as in Example 1 except that raw materials were mixed such that the molar ratio of Fe to $LiMnPO_4$ (Fe/$LiMnPO_4$) should be 0.031 instead of 0.053.

The abundance ratio of Fe in the resultant dry material was evaluated by the same method as in Example 1, and the result is shown in Table 1. In addition, the relationship between the depth and the abundance ratio of Fe is illustrated in FIG. 1.

The resultant dry material was baked in the same manner as in Example 1 to obtain an electrode material of Example 2. The result of the abundance ratio of Fe which was evaluated with respect to the resultant electrode material by the same manner as in Example 1 is shown in Table 1. In addition, the relationship between the depth and the abundance ratio of Fe is illustrated in FIG. 2.

Each of a paste, an electrode plate, and lithium ion battery of Example 2 was obtained by the same manner as in Example 1 except that the electrode material obtained in Example 2 was used instead of the electrode material obtained in Example 1. The charge-discharge characteristics of the resultant lithium ion battery were evaluated by the same manner as in Example 1, and the result is shown in Table 2, FIGS. 3 and 4.

Example 3

A dry material of Example 3 was obtained by the same manner as in Example 1 except that raw materials were mixed such that the molar ratio of Fe to $LiMnPO_4$ (Fe/$LiMnPO_4$) should be 0.10. The abundance ratio of Fe in the resultant dry material was evaluated by the same method as in Example 1, and the result is shown in Table 1. In addition, the relationship between the depth and the abundance ratio of Fe is illustrated in FIG. 1.

The resultant dry material was baked in the same manner as in Example 1 to obtain an electrode material of Example 3. With respect to the resultant electrode material, the result of the abundance ratio of Fe which was evaluated by the same manner as in Example 1 is shown in Table 1. In addition, the relationship between the depth and the abundance ratio of Fe is illustrated in FIG. 2.

Each of a paste, an electrode plate, and lithium ion battery of Example 3 was obtained by the same manner as in Example 1 except that the electrode material obtained in Example 3 was used instead of the electrode material obtained in Example 1. The charge-discharge characteristics of the resultant lithium ion battery were evaluated by the same manner as in Example 1, and the result is shown in Table 2, FIGS. 3 and 4.

Comparative Example 1

$LiMnPO_4$ particles which were obtained with the same method as Example 1, a Li source, an Fe source, and a $PO_4$ source were mixed with water at a mixing ratio of 1:1:1:1 (mol) such that a molar ratio (Fe/$LiMnPO_4$) of Fe to $LiMnPO_4$ was 0.053, followed by dispersing with a sand mill at 2500 rpm for 6 hours.

Next, after hydrothermal synthesis at 120° C. for 1 hour, the obtained precipitates were washed with water. As a result, Fe-containing olivine-structured $LiMnPO_4$ particles were obtained on the surfaces.

Next, the obtained particles were mixed with polyvinyl alcohol such that the amount (mass ratio; PVA/$LiMnPO_4$) of polyvinyl alcohol to the $LiMnPO_4$ particles was 0.05.

Next, this mixed solution was sprayed in the air at 180° C. to obtain a dry material.

The results of evaluating the abundance ratio of Fe in the dry material with the same method as that of Example 1 is shown in Table 1. In addition, a relationship between the depth and the abundance ratio of Fe is illustrated in FIG. 1.

The obtained dry material was baked with the same method as that of Example 1. As a result, an electrode material of Comparative Example 1 was obtained.

The results of evaluating the abundance ratio of Fe in the electrode material with the same method as that of Example 1 is shown in Table 1. In addition, a relationship between the depth and the abundance ratio of Fe is illustrated in FIG. 2.

A paste, an electrode plate, and a lithium ion battery of Comparative Example 1 were obtained with the same method as that of Example 1, except that the electrode material obtained in Comparative Example 1 was used instead of the electrode material obtained in Example 1.

The results of evaluating the charge-discharge characteristics of the lithium ion battery which were measured with the same method as that of Example 1 are shown in Table 2 and FIGS. 3 and 4.

Comparative Example 2

A dry material, a paste, an electrode plate, and a lithium ion battery of Comparative Example 2 were obtained with the same method as that of Example 1, except that the molar ratio (Fe/$LiMnPO_4$) of Fe to $LiMnPO_4$ was changed to 0.18.

The abundance ratio of Fe in the dry material which was measured with the same method as that of Example 1 is shown in Table 1. In addition, a relationship between the depth and the abundance ratio of Fe is illustrated in FIG. 1.

The abundance ratio of Fe in the electrode material which was measured with the same method as that of Example 1 is shown in Table 1. In addition, a relationship between the depth and the abundance ratio of Fe is illustrated in FIG. 2.

The results of evaluating the charge-discharge characteristics of the lithium ion battery which were measured with the same method as that of Example 1 are shown in Table 2 and FIGS. 3 and 4.

Comparative Example 3

A dry material of Comparative Example 3 was obtained by the same manner as in Example 1 except the molar ratio of Fe to $LiMnPO_4$ (Fe/$LiMnPO_4$) was set to be 0.008.

The abundance ratio of Fe in the resultant dry material was evaluated by the same method as in Example 1, and the result is shown in Table 1. In addition, the relationship between the depth and the abundance ratio of Fe is illustrated in FIG. 1.

The resultant dry material was baked in the same manner as in Example 1 to obtain an electrode material of Comparative Example 3.

With respect to the resultant electrode material, the result of the abundance ratio of Fe which was evaluated by the same manner as in Example 1 is shown in Table 1. In addition, the relationship between the depth and the abundance ratio of Fe is illustrated in FIG. 2.

Each of a paste, an electrode plate, and lithium ion battery of Comparative Example 3 was obtained by the same manner as in Example 1 except that the electrode material obtained in Comparative Example 3 was used instead of the electrode material obtained in Example 1.

The charge-discharge characteristics of the resultant lithium ion battery were evaluated by the same manner as in Example 1, and the result is shown in Table 2, FIGS. 3 and 4.

Table 1

TABLE 1

| | Abundance Ratio of Fe(Fe/(Fe + Mn)) | | | | | | | | | | | |
|---|---|---|---|---|---|---|---|---|---|---|---|---|
| | Dry material | | | | | | Electrode Material | | | | | |
| Measurement Depth (nm) | Example 1 | Example 2 | Example 3 | Comparative Example 1 | Comparative Example 2 | Comparative Example 3 | Example 1 | Example 2 | Example 3 | Comparative Example 1 | Comparative Example 2 | Comparative Example 3 |
| Outermost surface | 0.453 | 0.298 | 0.754 | 0.783 | 0.900 | 0.198 | 0.157 | 0.080 | 0.227 | 0.280 | 0.712 | 0.016 |
| 1 | 0.283 | 0.202 | 0.433 | 0.281 | 0.683 | 0.103 | 0.061 | 0.051 | 0.163 | 0.059 | 0.536 | 0.015 |
| 3 | 0.154 | 0.096 | 0.314 | 0.151 | 0.434 | 0.078 | 0.053 | 0.046 | 0.150 | 0.053 | 0.376 | 0.009 |
| 5 | 0.120 | 0.086 | 0.262 | 0.134 | 0.359 | 0.040 | 0.044 | 0.033 | 0.152 | 0.048 | 0.286 | 0.012 |
| 10 | 0.092 | 0.046 | 0.205 | 0.088 | 0.272 | 0.025 | 0.045 | 0.031 | 0.158 | 0.047 | 0.225 | 0.011 |
| 15 | 0.078 | 0.035 | 0.154 | 0.079 | 0.230 | 0.020 | 0.048 | 0.029 | 0.150 | 0.045 | 0.208 | 0.010 |
| 20 | 0.070 | 0.029 | 0.150 | 0.067 | 0.212 | 0.016 | 0.045 | 0.030 | 0.149 | 0.045 | 0.180 | 0.009 |
| 50 | 0.051 | 0.021 | 0.149 | 0.052 | 0.183 | 0.013 | 0.043 | 0.033 | 0.144 | 0.038 | 0.179 | 0.011 |

Table 2

TABLE 2

| | Current Capacity (mAh/g) | | Power Capacity (mWh/g) | |
|---|---|---|---|---|
| | 0.1 C | 3 C | 0.1 C | 3 C |
| Example 1 | 150 | 134 | 586 | 460 |
| Example 2 | 148 | 130 | 580 | 450 |
| Example 3 | 147 | 135 | 576 | 458 |
| Comparative Example 1 | 125 | 66 | 479 | 203 |
| Comparative Example 2 | 148 | 135 | 567 | 466 |
| Comparative Example 3 | 113 | 59 | 425 | 161 |

It was found from the results of Examples 1 to 3 and Comparative Examples 1 to 3 that, even when the amounts of Fe contained in all the $LiMnPO_4$ particles are the same, as the abundance ratio on the surfaces of the $LiMnPO_4$ particles is decreased, a battery having higher capacity and higher energy can be obtained.

In addition, it was found from the results of Example 1 and Comparative Example 2 that, when the amount of Fe contained in all the $LiMnPO_4$ particles is excessively large, a plateau potential derived from a large amount of Fe appears during discharging. That is, it was found that, when the amount of Fe in the electrode material is 0.1 mol or less with respect to 1 mol of $LiMnPO_4$, a plateau potential derived from a large amount of Fe does not appear, and a lithium ion battery having high versatility can be provided.

In the electrode material according to the invention, the content of Fe in the electrode material is 0.01 to 0.1 mol with respect to 1 mol of $Li_xA_yD_zPO_4$, and the abundance ratio (Fe/(Fe+A+D)) of Fe on the surfaces of the $Li_xA_yD_zPO_4$ particles is 0.02 to 0.25. Therefore, the effects of $Li_xA_yD_zPO_4$ particles such as high capacity and high energy can be exhibited. In addition, the electrode material according to the invention is applicable to a next-generation secondary battery in which higher voltage and higher energy density, higher load characteristics and high-speed charge-discharge characteristics are expected, and when being used for a next-generation secondary battery, the effects thereof are significantly high.

[FIG. 1]
ABUNDANCE RATIO OF Fe
EXAMPLE 1
COMPARATIVE EXAMPLE 1
COMPARATIVE EXAMPLE 2
DEPTH

[FIG. 2]
ABUNDANCE RATIO OF Fe
EXAMPLE 1
COMPARATIVE EXAMPLE 1
COMPARATIVE EXAMPLE 2
DEPTH

[FIG. 3]
VOLTAGE
EXAMPLE 1
COMPARATIVE EXAMPLE 1
COMPARATIVE EXAMPLE 2
CURRENT CAPACITY

[FIG. 4]
VOLTAGE
EXAMPLE 1
COMPARATIVE EXAMPLE 1
COMPARATIVE EXAMPLE 2
CURRENT CAPACITY

What is claimed is:

1. An electrode material comprising
olivine-structured particles of the formula $LiMnPO_4$, containing Fe on surfaces thereof, that are coated with a carbon coating film,
wherein an abundance of Fe is 0.03 to 0.1 mol with respect to 1 mol of $LiMnPO_4$, and
an abundance ratio (Fe/(Fe+Mn)) of Fe on surfaces of the $LiMnPO_4$ particles is 0.08 to 0.227.

2. The electrode material according to claim 1,
wherein the abundance of Fe is decreased from the surfaces of the $LiMnPO_4$ particles toward centers of the $Li_xMn_yPO_4$ particles.

3. The electrode material according to claim 1, comprising
aggregated particles that are obtained by allowing the $LiMnPO_4$ particles to aggregate.

4. A paste comprising:
the electrode material according to claim 1;
a conductive auxiliary agent; and
a binder.

5. An electrode plate which is obtained by forming an electrode on a principal surface of a current collector using the paste according to claim 4.

6. A lithium ion battery comprising
the electrode plate according to claim 5.

7. The electrode material according to claim 1, wherein the power capacity, which is calculated from the result of measuring the current capacity at a discharge current of 0.1 C, is 576 m Wh/g or higher.

8. The electrode material according to claim 1, wherein an abundance ratio (Fe/(Fe+Mn)) of Fe on surfaces of the $LiMnPO_4$ particles is 0.08 to 0.20.

* * * * *